US008165802B2

(12) United States Patent
Ta et al.

(10) Patent No.: US 8,165,802 B2
(45) Date of Patent: Apr. 24, 2012

(54) METHOD AND APPARATUS OF VEHICLE NAVIGATION SYSTEM FOR DETECTING AND AVOIDING CITY WITH CROWDED STREETS

(75) Inventors: Hong Ta, Norwalk, CA (US); Tien Vu, Westminster, CA (US)

(73) Assignee: Alpine Electronics of America, Inc., Torrance, CA (US)

( * ) Notice: Subject to any disclaimer, the term of this patent is extended or adjusted under 35 U.S.C. 154(b) by 711 days.

(21) Appl. No.: 12/247,154

(22) Filed: Oct. 7, 2008

(65) Prior Publication Data
US 2010/0088013 A1 Apr. 8, 2010

(51) Int. Cl.
*G01C 21/00* (2006.01)
(52) U.S. Cl. ....................................... 701/410
(58) Field of Classification Search .................. 701/209, 701/202, 208, 211, 200, 201, 207, 118
See application file for complete search history.

(56) References Cited

U.S. PATENT DOCUMENTS

| 6,098,015 | A  * | 8/2000 | Nimura et al. ............... 701/209 |
| 6,118,389 | A  * | 9/2000 | Kamada et al. ........... 340/995.21 |
| 7,206,692 | B2 * | 4/2007 | Beesley et al. ............... 701/202 |
| 7,376,509 | B2 * | 5/2008 | Endo et al. .................... 701/209 |
| 7,512,489 | B2 * | 3/2009 | Endo et al. .................... 701/209 |
| 7,788,029 | B2 * | 8/2010 | Nagase et al. ................ 701/209 |
| 7,890,252 | B2 * | 2/2011 | Sekine et al. ................. 701/202 |
| 2004/0049338 | A1 * | 3/2004 | Beesley et al. ................ 701/202 |
| 2004/0225437 | A1 * | 11/2004 | Endo et al. .................... 701/209 |
| 2007/0150185 | A1 * | 6/2007 | Nagase et al. ................ 701/209 |
| 2008/0114542 | A1 * | 5/2008 | Nambata et al. ............. 701/209 |
| 2009/0024322 | A1 * | 1/2009 | Tomita et al. ................. 701/211 |

* cited by examiner

*Primary Examiner* — Mary Cheung
*Assistant Examiner* — Truc M Do
(74) *Attorney, Agent, or Firm* — Knobbe, Martens, Olson & Bear LLP

(57) ABSTRACT

A system for comparing various routes, identifying delays among the routes, and selecting a more desirable route, even if the desirable route is not the shortest distance, is described. In one embodiment, the more desirable route is the faster route. In one embodiment, the more desirable route is a route with fewer in-route delays. In one embodiment, the system loads a map from a memory and retrieves road level information based on position information of roads and delays. The roads in the map are described at various levels of detail, wherein lower levels contain more detail and relatively higher levels that contain less detail. One embodiment includes detecting a route having links with a substantially larger number of delays and adding an additional penalty cost for the links at higher levels based on penalties computed from the links at lower level road levels. If a current road level is not the highest, one embodiment include adding the additional penalty cost into a "penalty list" of a higher level link having the links of a current road level in order to detect the higher links with a large number of delays while calculating route at a higher level. When calculating a route (or portion of a route) at a higher road level, an additional penalty cost is added to the higher level links if based on the penalty list.

10 Claims, 6 Drawing Sheets

METHOD AND APPARATUS OF VEHICLE NAVIGATION SYSTEM FOR DETECTING AND AVOIDING CITY WITH CROWDED STREETS

BACKGROUND OF THE INVENTION

1. Field of the Invention

The present invention relates to a method, a system, and/or an apparatus for navigation, in particular to detecting and avoiding routes with many delays.

2. Description of the Related Art

A vehicle navigation system helps a driver in finding a route while driving in an unfamiliar area. Many navigation systems allow the user to input a destination (and, optionally a starting point) and then the navigation system selects the shortest route. However, in many cases, especially in cities, the shortest route may not be the most desirable route. In reality, routes relatively short in distance but with various delays, such as many intersections, fewer lanes, traffic restrictions such as stop signs, etc., are not as desirable as a route that is somewhat longer in distance but shorter in time owing to fewer such delays. When a driver drives a relatively longer distance where a freeway is not available, avoiding such delays is desirable even if the route taken is somewhat longer. Therefore, there is a need for a navigation system to consider these delays in finding a more desirable route.

SUMMARY

These and other problems are solved by a system for comparing various routes, identifying delays among the routes, and selecting a more desirable route, even if the desirable route is not the shortest distance. In one embodiment, the more desirable route is the faster route. In one embodiment, the more desirable route is a route with fewer in-route delays. In one embodiment, the system loads a map from a memory and retrieves road level information based on position information of roads and delays. The roads in the map are described at various levels of detail, wherein lower levels contain more detail (e.g., relatively shorter links that describe the roads as relatively finer grain) and relatively higher levels that contain less detail (e.g., relatively longer links that describe sections of the road at relatively coarser grain). One embodiment includes detecting a route having links with a substantially larger number of delays (e.g., intersections, stop signs, etc.) and adding an additional penalty cost for the links at higher levels based on penalties computed from the links at lower level road levels. If a current road level is not the highest, one embodiment include adding the additional penalty cost into a "penalty list" of a higher level link having the links of a current road level in order to detect the higher links with a large number of delays while calculating route at a higher level. When calculating a route (or portion of a route) at a higher road level, an additional penalty cost is added to the higher level links if based on the penalty list.

One embodiment includes a system for identifying routes with larger numbers of delays. The system for detecting a route includes a storage system that stores a map and a processor programmed to detect a route using the map, and retrieves road level information based on position information of roads and delays. The roads in the map are available at a lowest road level and relatively longer links are available at higher road levels. The system for detecting a route detects a route having links with a relatively larger number of intersections while calculating a route from a departure location to a destination, and adds an additional penalty cost for the links at a low road level calculation. If a current road level is not the highest, the system includes the additional penalty cost into a "penalty list" of a higher level link having the links of a current road level in order to detect the higher links with a large number of delays while calculating route at a higher level. While calculating a route at a higher level, the system checks and adds an additional cost for the higher level links if they are listed on the penalty list.

One embodiment includes a vehicle navigation device for selecting a desirable route. The vehicle navigation device includes a storage system that stores a map and a processor programmed to calculate a route using, at least in part, the map information. The processor retrieves road level information based on position information of roads and delays, wherein relatively shorter links in the roads in the map are described at lower road levels and longer links are described at higher road levels. The vehicle navigation device identifies routes having links with a relatively larger number of intersections while calculating a route or portion of a route, and adds a penalty cost for the links at a lower road level calculation. If a current road level is not the highest level, the vehicle navigation device includes the additional penalty cost into a "penalty list" of a higher level link having the links of a current road level in order to identify the higher links with a larger number of delays while calculating route or portion of a route at the higher level. The vehicle navigation device checks and adds an additional cost for the higher level links if they are listed on the penalty list.

In one embodiment, the method of detecting a route includes checking if each link length is shorter than a predetermined length and marking the shorter link as marked if the above is true, determining a link comprising a plurality of links as a crowded link if a number of consecutive marked links in the link is larger than a predetermined value, and avoiding the crowded link as a result of the determination.

In one embodiment, the method of detecting a route includes computing how each link is spaced and assigning a higher penalty to each link in accordance with a degree of regularity of each link.

In one embodiment, the method of detecting a route includes computing a cost of a link or a link by weighing factors such as a length of a link, a speed limit, whether a link belongs to a main road or side road, and a node cost at a delay due to a restriction such as turning directions.

DETAILED DESCRIPTION

Figure 1:
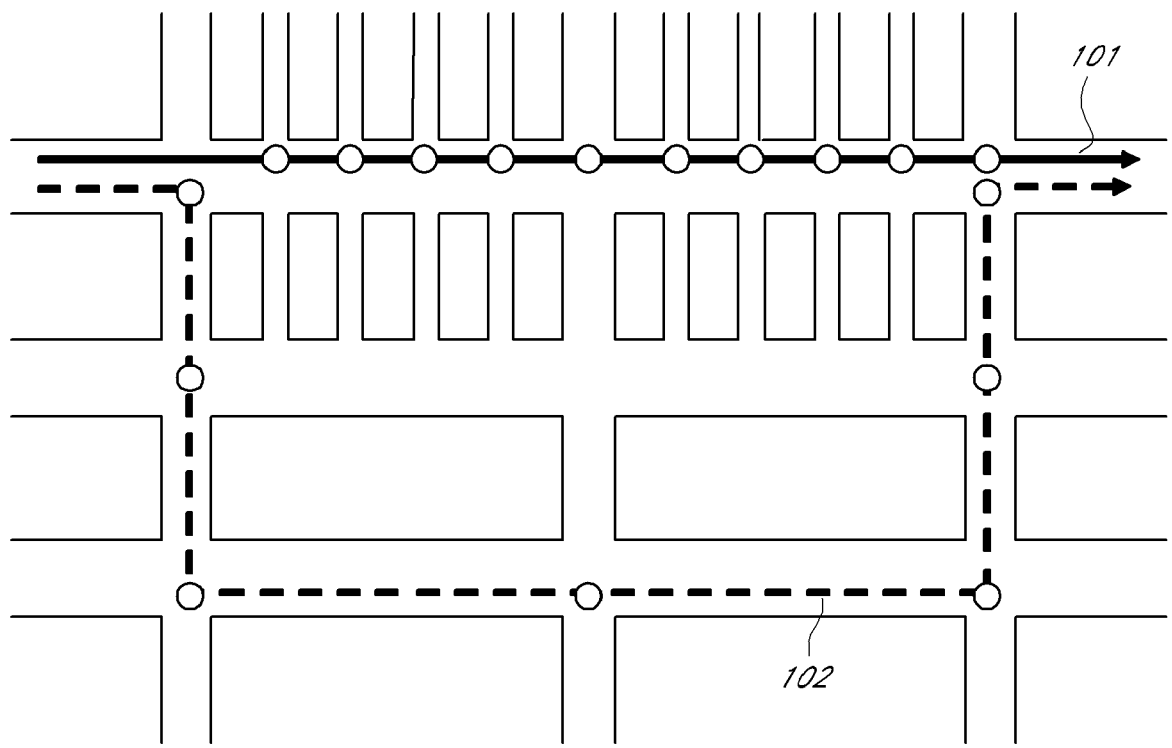
FIG. 1A is a representative view of a vehicle navigation system showing routes to be chosen and routes to be avoided.
FIG. 1B is a map example illustrating routes to be chosen and routes to be avoided.
Figure 1A:
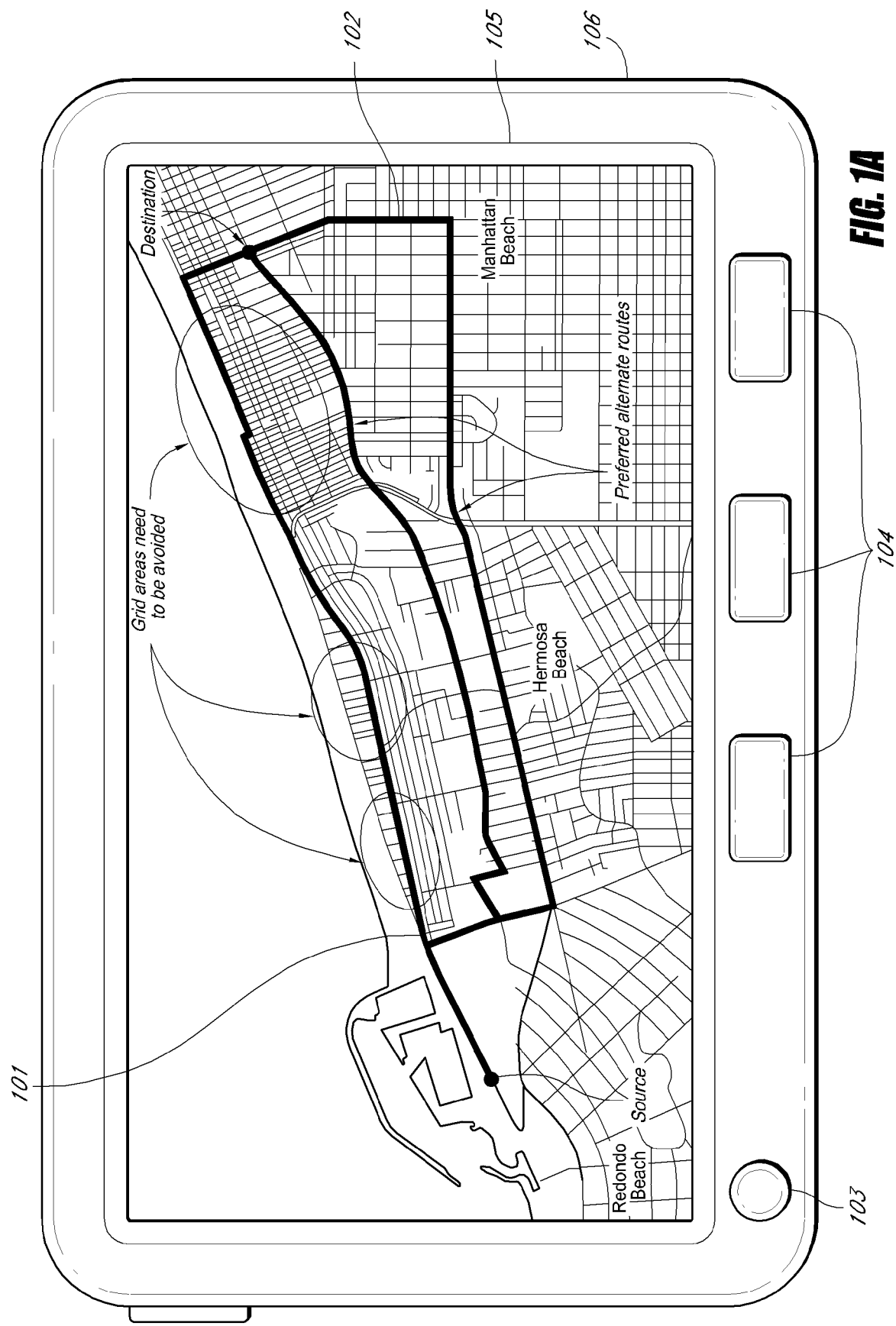

FIG. 1A illustrates a route navigation device 106 that has a processor (not shown) that calculates a route from a departure location to a destination, a memory (not shown) that stores maps and other navigation related information, a power button 103, one or more user input controls 104, and a display 105. The figure shows the display 105 displaying a map example of two routes, a first route 101, which is shorter in distance but longer in time because it has many delays (e.g., speed reductions, turns, stops, etc.) Also shown is a second route 102 which is longer in distance than the route 101 but shorter in time because it has fewer delays than the route 101, and is therefore more desirable.

FIG. 1B is a schematic map showing the two routes, 101 and 102. The shorter route 101 includes 12 road links and the longer route 102 includes only 8 links. The route 101 is shorter than the route 102 because the sum of the lengths of the links in the route 101 is less than the sum of the lengths of the links in the route 102. The road links are connected at nodes (shown as circles in the schematic). In many cases, at the lowest road level each node corresponds to an intersection. However, nodes can also correspond to other features such as, for example, turns in the road, stop signs, changes in speed limit, etc. Each node is a potential delay. Delays can include, for example, intersections, stop signs, crosswalks, lower speed limits, turns, school zones, etc. Thus, even though the route 101 is physically shorter than the route 102, the route 101 is potentially longer in time because it has more nodes than the route 102 and each node represents a potential delay.

Figure 2:
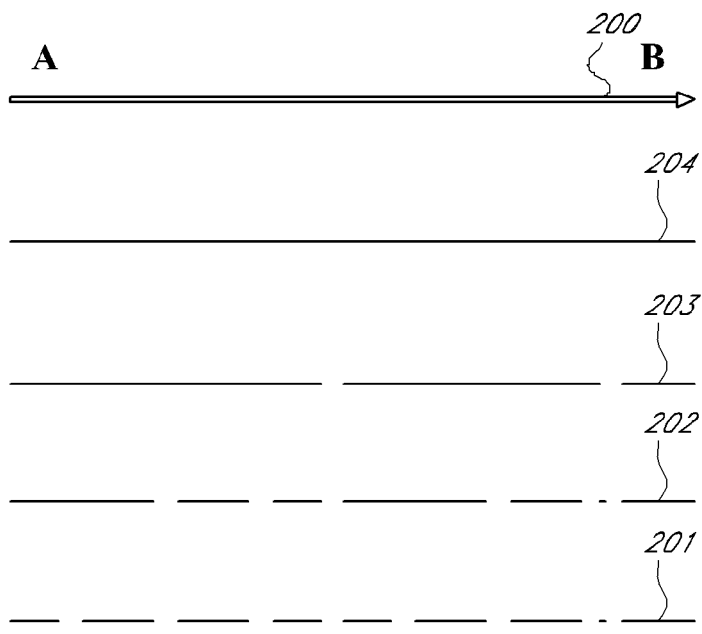
FIG. 2 is a diagram of a concept of road levels.

FIG. 2 shows the concept of road levels to be included in a route. In FIG. 2, a link represents a unit of each road level which is defined by two nodes. Each node represents a transition from one road link to another road link. At a lower road level, the links of each road are shorter than the links at higher road levels. The links at higher levels represent combinations of links from the lower levels. For example, at road level 0 201 (a lowest level in FIG. 2), each link is defined by two delay points, including intersections of stop or without traffic lights. At road level 1 202, two delay points can be with traffic lights or more lanes than these of road level 0. At road level 2 203, two delay points can be of major intersections. At road level 3 204 (a highest level in FIG. 2), each link corresponds to an entrance and an exit of an interstate. The level of crowding in a route or portion of a route is crowded is a combination of the crowding at the various road levels.

Figure 3:
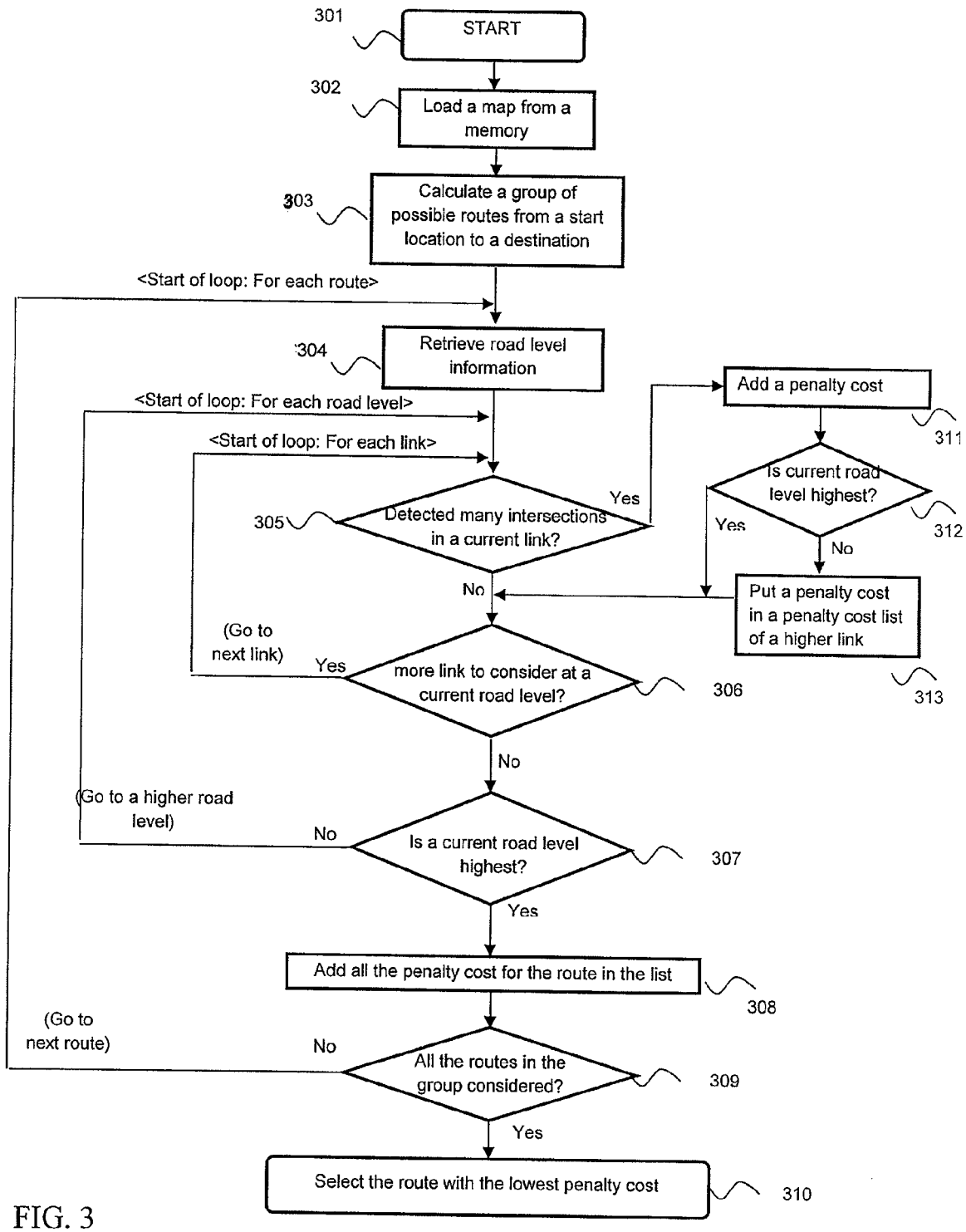
FIG. 3 is a map example which illustrates detecting a crowded link by checking consecutive short links.

FIG. 3 is a flowchart for detecting a crowded route. In a block 302, the navigation system 106 loads a map from the memory. Using the map, the processor can calculate a number of possible routes available for navigating from a start location to a destination. Thus, in a block 303, the processor calculates a group of possible routes from the departure location to the destination location.

In a block 304, the navigation system 106 retrieves road level information based on position information of roads and delay points included in each route.

Using the retrieved road level information, the navigation system computes a penalty cost for each link of each road level, starting from the departure location to the destination, and from the lowest level to the highest level. The penalty costs are based, at least in part, on the number of delays and the magnitude of the various delays in the route or portion of a route. If the system detects a relatively large delay in a current link (shown as block 305), the navigation system adds a penalty cost for the current link (shown as block 311). If the current road level is not the highest level (block 312), the navigation system also includes the penalty cost in a penalty cost of a higher level (block 313). Then the navigation system checks if there are more links to consider at a current road level (block 306). If there is another link to be considered, the navigation system loops back to the block 305 and selects the next link in the current route.

If no more links to be considered are found in the current road level, the navigation system checks a status of the current road level (block 307). If the current road level is not the highest road level, the navigation system selects a different road level and loops back to block 305.

When the navigation system has computed the penalty costs for the links of the road levels in a current route, the navigation system adds all the penalty costs for the route in the list (block 308). Penalty costs of lower road levels are considered in a penalty cost list of the highest road level as a result of including lower road level penalty cost information at higher road levels (block 311). If there are more routes to be considered, the navigation system selects another route and loops back to block 305.

After computing the penalty costs for the routes in the group of possible routes (block 309), the navigation system compares the penalty costs across the routes, and selects the route with the lowest penalty cost as a preferable route. As a result of selecting the preferable route, the driver can avoid a crowded route that has a larger number of delays.

Figure 4:
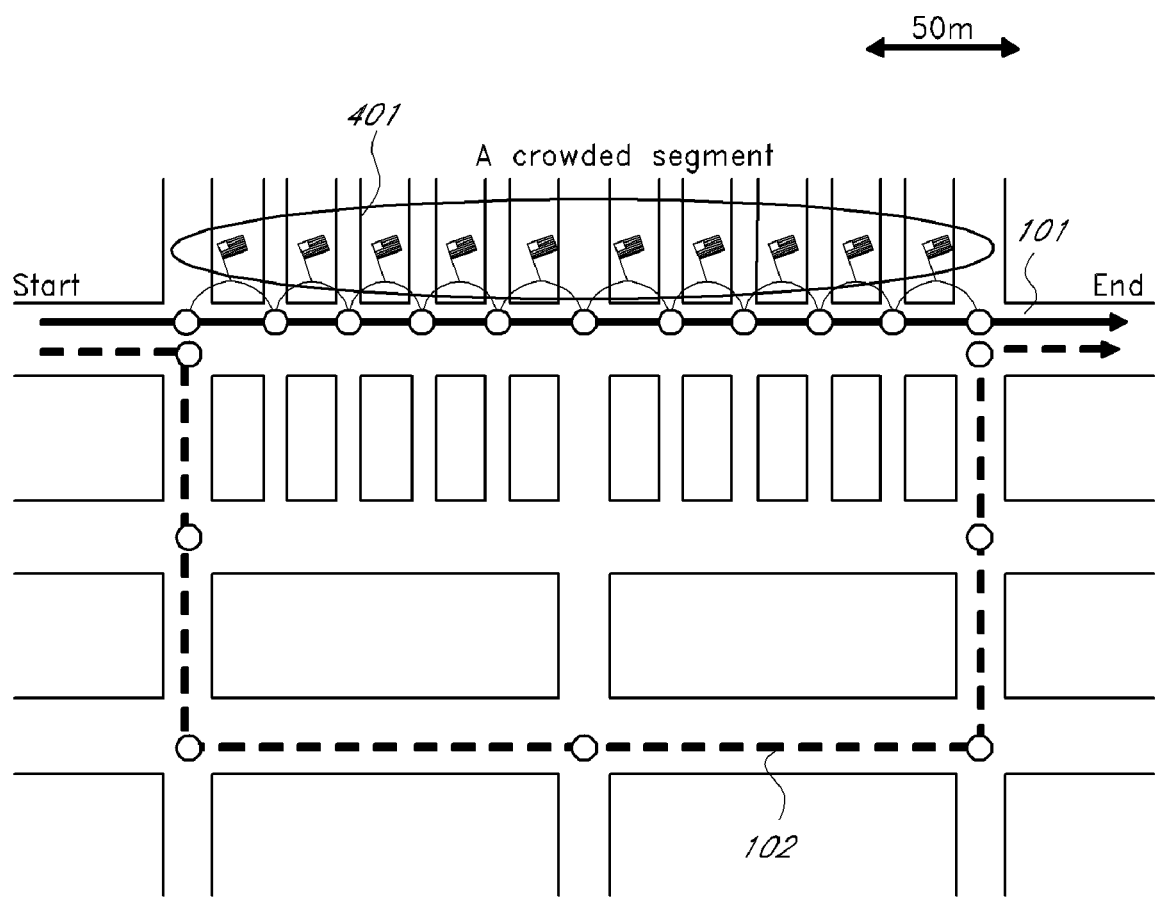
FIG. 4 is a flowchart showing detecting of substantially large number of intersections, by tracing each link and each road level, in each route.

FIG. 4 shows a process for identifying a crowded route (e.g., a route with relatively many potential delays). When a route includes many delays (401 in FIG. 4), many links of the lowest road level tend to be short. Therefore, detecting a crowded route of many delays is executed by detecting short links within a route. Therefore, each link is compared with a predetermined length x. The value x can be set to any desired length from 1 meter to many kilometers. In one embodiment, by way of example and not limitation, x can be selected as 50 meters. If the link is shorter than x, then the navigation system sets a flag indicative of a shorter link. After executing this comparison through the links in a route, the navigation system counts the number of flagged links in the route. If the number of flagged links is equal or larger than a predetermined value N, then the route is considered to be a crowded route. The value of N can be any number from 1 to hundreds of flagged links. In one embodiment, by way of example an not limitation, N was selected as 10. In one embodiment, the length x and the value N are chosen according to a distance between a departure location and a destination.

Figure 5:
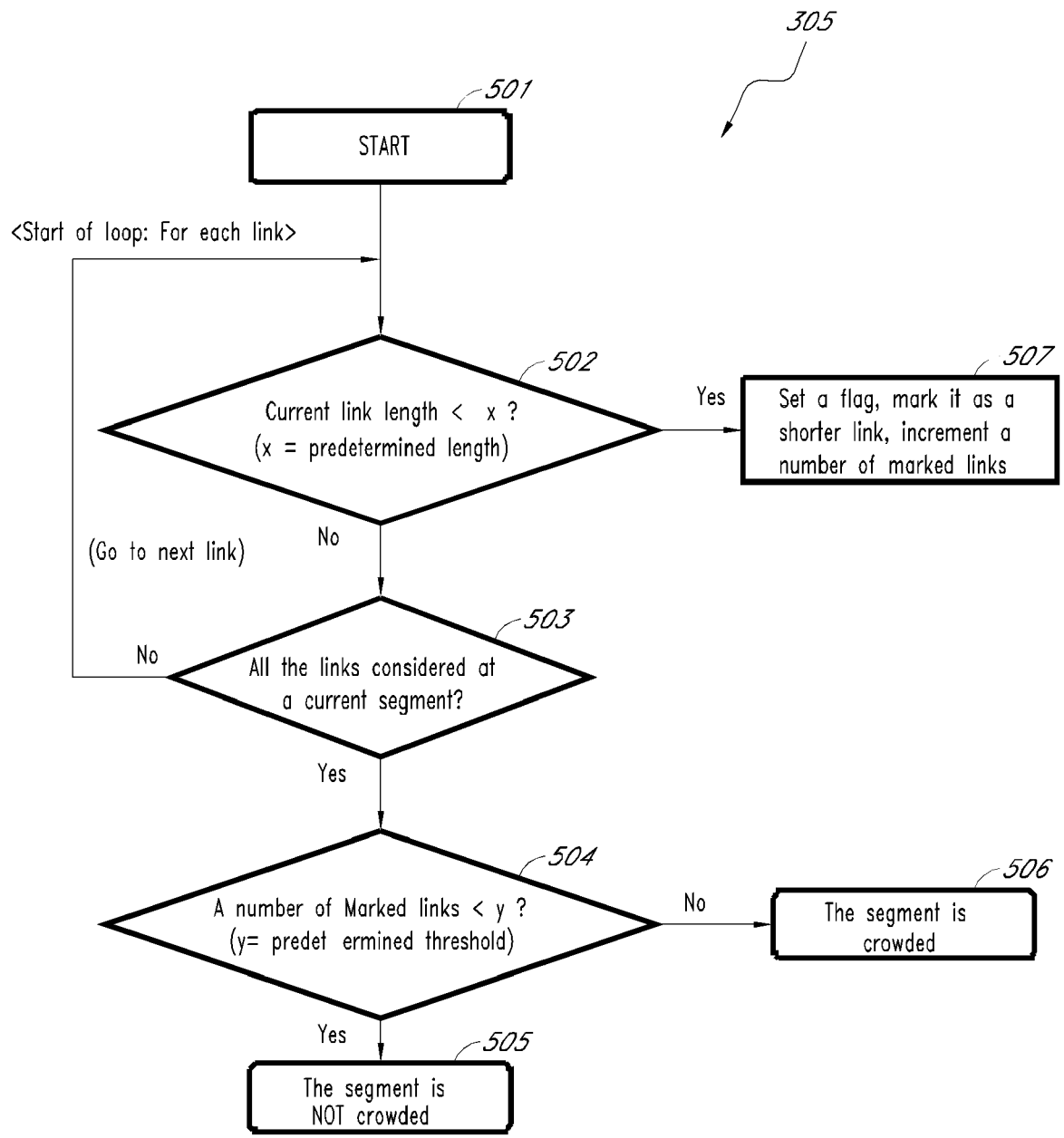
FIG. 5 is a flowchart showing detecting of a crowded link with many delays by checking a number of consecutive short links.

FIG. 5 is a flowchart for the identification scheme described in connection with FIG. 4. For each link contained in a link, the navigation system measures each link length, and checks if the link length is shorter than a predetermined length x (block 502). If the length is shorter than the predetermined length x, the navigation system sets a flag, marking the link as a shorter link (block 507). After the links in the link are compared with the predetermined length (block 503), the navigation system checks whether the shorter links continue in the link, by comparing a number of consecutive marked links in the link is larger than a predetermined value (block 504). If the number of consecutive marked links is smaller than the predetermined value, the link is considered as "not crowded" (block 505). Otherwise, the link is considered as a crowded route (block 506). The navigation system avoids including the crowded link while determining a route between the departure location and the destination.

In another embodiment, the penalty cost is determined by computing regularity of the links included in the link. If the degree of irregularity is high, then the link is likely to include many short links even though there are no consecutive short links within the link. The short links are indicative of many potential delays. Thus, by assigning a higher penalty to each link in accordance with a degree of regularity, the irregularity of the link with a number of discrete short links can be considered in computing penalties.

In another embodiment, while computing the penalty cost of links, the navigation system considers various weighing factors. For instance, a length of a link, a speed limit, whether a link belongs to a main road or side road, a number of lanes, a node cost delay at a node between links, etc.

Once the processor has selected the desired route, the route can be displayed on the display 105 and/or used to guide the driver to the desired destination.

It will be understood by those skilled in the art that the present inventions extend beyond the specifically disclosed embodiments to other alternative embodiments and/or uses of the inventions and obvious modifications and equivalents thereof. In addition, other modifications which are within the scope of this invention will be readily apparent to those of skill in the art based on this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying mode of the disclosed invention. Thus it is intended that the scope of at least some of the present invention herein disclosed should not be limited by the particular disclosed embodiment described above.

What is claimed is:

1. A method for selecting a route for user navigation from a first location to a second location in an electronic navigation device, said route including a plurality links corresponding to a plurality of road levels, wherein links at higher road levels comprise combinations of links at lower road levels and wherein said links at said higher road levels inherit costs from said combinations of links at said lower road levels, the method comprising:
    electronically loading a map from a memory;
    electronically retrieving road-level information based on position information of roads and delays;
    identifying a plurality of routes, each route comprising links at a higher road level and at least some of said routes including a larger number of potential delays;
    electronically assigning crowded penalty costs for crowded links, said assigning comprising,
        comparing a length of a first link at a lower road level to a predetermined length;
        marking said first link as a marked link if said length of the first link is less than the predetermined length;
        identifying a link as a crowded link if said link comprises a predetermined number of consecutive marked links; and
        assigning a crowded penalty cost for said crowded link;
    electronically assigning penalty cost for one or more links at a lower road level;
    when links at said higher road level include said one or more links at said lower road level having any type of cost, accounting for said cost in a penalty list associated with said links at said higher road level;
    when one of said routes includes said links at said higher road level with said penalty list, accounting for said costs in said penalty list during a calculation of a total penalty cost of said one route; and
    selecting a final route from said plurality of routes with a relatively lower total penalty cost.

2. The method of claim 1, further comprising:
    computing a degree of regularity for at least some of said links; and
    assigning a regularity cost to said at least some of said links.

3. The method of claim 1, further comprising computing a cost of at least some of said links based, at least in part, on a length thereof.

4. The method of claim 1, further comprising computing a cost of at least some of said links based, at least in part, on a delay.

5. The method of claim 1, further comprising computing a cost of at least some of said links based, at least in part, on an intersection.

6. The method of claim 1, further comprising computing a cost of at least some of said links based, at least in part, on a stop sign.

7. The method of claim 1, further comprising computing a cost of at least some of said links based, at least in part, on a speed limit.

8. An apparatus for selecting a route for user navigation from a first location to a second location, said route including a plurality links corresponding to a plurality of road levels, wherein links at higher road levels comprise combinations of links at lower road levels and wherein said links at said higher road levels inherit costs from said combinations of links at said lower road levels, comprising:
    a storage system that stores a map;
    a processor that identifies routes on said map, each route comprising links at a higher road level, at least some of said routes including a number of delays, the processor additionally calculating a cost for each route, said calculating including, accounting in a cost list of a link at a higher road level costs of links at said low road level when said links at said lower road level are included in said link at said higher road level, said processor selecting a final route from said routes, said final route selected at least in part on said cost lists of said links at said higher road level of said final route being smaller than costs lists associated with other routes, and said processor associating a cost with crowded links, said associating comprising comparing a length of a link with a predetermined length, marking the link when the predetermined length is longer, determining a link at said higher road level is a crowded link if a number of consecutive marked links at said lower road level in said link at said higher level is larger than a predetermined value; and
    a display that displays said final route selected by the processor.

9. The apparatus of claim 8, wherein the processor determines if a link in one of said routes is relatively regularly spaced and assigns a cost to links that are less regularly spaced.

10. The apparatus of claim 8, wherein the processor computes a combination of costs for a link.

* * * * *